(12) United States Patent
Frank

(10) Patent No.: US 9,523,353 B2
(45) Date of Patent: Dec. 20, 2016

(54) BLADE BEARING OR NACELLE BEARING OF A WIND TURBINE

(75) Inventor: Hubertus Frank, Höchstadt (DE)

(73) Assignee: IMO Holding GmbH, Gremsdorf (DE)

( * ) Notice: Subject to any disclaimer, the term of this patent is extended or adjusted under 35 U.S.C. 154(b) by 57 days.

(21) Appl. No.: 14/366,999

(22) PCT Filed: Dec. 20, 2011

(86) PCT No.: PCT/EP2011/006428
§ 371 (c)(1),
(2), (4) Date: Nov. 5, 2014

(87) PCT Pub. No.: WO2013/091664
PCT Pub. Date: Jun. 27, 2013

(65) Prior Publication Data
US 2015/0071578 A1    Mar. 12, 2015

(51) Int. Cl.
| | |
|---|---|
| *F16H 1/28* | (2006.01) |
| *F03D 11/00* | (2006.01) |
| *F16C 17/12* | (2006.01) |
| *F16C 33/10* | (2006.01) |
| *F16C 19/18* | (2006.01) |
| *F16C 19/38* | (2006.01) |

(52) U.S. Cl.
CPC ......... *F03D 11/0008* (2013.01); *F03D 15/00* (2016.05); *F03D 80/70* (2016.05); *F16C 17/12* (2013.01); *F16C 33/1095* (2013.01); *F16H 1/28* (2013.01); *F05B 2260/40311* (2013.01); *F05B 2260/79* (2013.01); *F16C 19/181* (2013.01); *F16C 19/38* (2013.01); *Y02E 10/722* (2013.01); *Y02E 10/726* (2013.01)

(58) Field of Classification Search
CPC ........................................................ F16H 1/28
See application file for complete search history.

(56) References Cited

U.S. PATENT DOCUMENTS

2012/0220418 A1* 8/2012 Frank ................... F16H 1/28
475/331

FOREIGN PATENT DOCUMENTS

| DE | 100 03 350 | 8/2001 |
|---|---|---|
| JP | 2006 077753 | 3/2006 |
| WO | WO 2009/048403 | 4/2009 |

* cited by examiner

*Primary Examiner* — Derek D Knight
(74) *Attorney, Agent, or Firm* — Pandiscio & Pandiscio

(57) ABSTRACT

The invention relates to a blade bearing or nacelle bearing of a wind turbine, comprising two rings mounted adjacent to each other and rotatable relative to each other for connection on one side to the hub of the wind turbine and on the other side to a blade of same, or for connection on one side to the tower of the wind turbine and on the other side to the nacelle of same, wherein the two rings rotatable relative to one another are each provided with a circumferential internal toothing or are non-rotatably coupled for the purpose of joint toothed engagement by one or more toothed planetary gears running around a central sun gear, the planetary gears in turn meshing with the toothed sun gear.

9 Claims, 3 Drawing Sheets

BLADE BEARING OR NACELLE BEARING OF A WIND TURBINE

BACKGROUND OF THE INVENTION

1. Field of the Invention

The invention is directed to a blade bearing or nacelle bearing of a wind turbine, the bearing comprising two planar rings mounted adjacent to each other, and rotatable relative to each another, for connection on one side to a hub of the wind turbine and on the other side to a blade of the wind turbine, or for connection on one side to the tower of the wind turbine and on the other side to the gondola of the wind turbine.

2. Description of the Prior Art

Wind turbines place extreme demands on the materials and assemblies used. Because of the height of the structure, on the one hand, the materials and assemblies—especially in the region of the wind wheel and the gondola—must be as light as possible, since they have to be supported by the tower; but at the same time, these elements are subjected to extreme forces—including wind pressure and gusts—and therefore must be extremely robust. Particular complications result, especially in the region of the blade and nacelle bearings, since these components naturally have large diameters and, for reasons of weight, relatively small cross sections compared to the diameter; hence, there is always potential for deformation, especially if the structural elements connected to them become deformed. This, in turn, leads to serious internal stresses and consequently to increased wear and a greatly reduced service life for the affected bearing. Especially with radial bearings, which are the type most commonly used as blade or nacelle bearings, radial deformation of a ring, in which its ideal circular shape is bent elliptically, for example, is highly detrimental, since not only can individual rolling elements of the rolling bearing be overloaded in this way, but the seal covering the gap can also lose tightness in places, resulting in the leakage of lubricant or even the ingress of moisture or foreign bodies. At the same time, the active pivoting of this bearing—to adjust the pitch of the blades or the orientation of the gondola—places heightened demands on the mechanical systems used for this purpose, since considerable inertial forces must be overcome due to the high masses involved. Large servomotors, in turn, mean high weights and should therefore be avoided.

SUMMARY OF THE INVENTION

From the disadvantages of the described prior art comes the problem initiating the invention: to improve a blade bearing, or nacelle bearing, of the above species for a wind turbine in such a way that the smallest possible motors can be used to rotate the units connected to it; insofar as possible, the achievable service life of these bearings should be maximal even under the unfavorable operating conditions existing at the top of the tower of a wind turbine.

This problem is solved by the fact that, in the above species of blade bearing or nacelle bearing of a wind turbine, the two planar rings mounted adjacent to each other and rotatable relative to each other are each provided with or non-rotatably coupled to a circumferential inner toothing for the purpose of joint tooth engagement by one or more toothed planet gears revolving around a central sun gear and themselves meshing with the toothed sun gear.

Such an arrangement acts as a gear unit, especially if the two circumferential inner toothings have different, but preferably only slightly differing, tooth counts $z_1$, $z_2$, i.e., for example, a tooth count difference $\Delta z = |z_1 - z_2|$ of 10 teeth or less, preferably a difference $\Delta z$ of 7 teeth or less, particularly a difference $\Delta z$ of 3 teeth or less.

If, as the invention further provides, the toothing of each of the planet gears engaging therein has the same tooth count in both tooth engagement regions, a manner of operation is obtained in which, during a complete revolution of a planet gear, the two inner toothings—and thus the rings carrying them—rotate relative to each other by a relative rotation angle $\alpha$ of only $(\Delta z/z_1) \cdot 360°$. Such a gear unit therefore has an extreme rotation speed reduction ratio and thus correspondingly high torque transmission. Sufficient drive can therefore be obtained from a relatively small drive motor with a low torque rating. At the same time, a small drive motor of this kind saves on weight.

It has proven beneficial for each of the two rings to be provided with or coupled to a respective disk, particularly a circular disk. These disks, which preferably occupy part or all of the area radially inside the particular ring, contribute substantially to a stiffening of the particular ring and thus of the entire bearing according to the invention. Such a disk located in the plane of the bearing offers maximal resistance to radial deformation, and thus protects the seal against leakage of lubricant and the ingress of moisture or foreign bodies. The fact that each of the two rings, each of which has a constant cross-sectional dimension apart from the contour of the toothing, is provided with such a disk ensures that each ring will have a uniform circular shape and thus that the bearing will function in a manner that is easy on the rolling elements and their raceways and will be optimally sealed. Depending on the embodiment, the disks can be screwed together with the particular ring or welded, riveted or otherwise connected to it. Integration of ring and disk into a single part would also be feasible, for example by hardening the respective parts simultaneously from the molten to a solid state in a mold.

By the fact that the two disks are fixed to mutually facing, planar end faces of respective rings, they also acquire a statically stiffening effect similar to that of upstand and downstand elements. This double disk structure thus provides tremendous stiffness against all the forces that come to bear. In addition, a cavity is created between the disks, in which the inventive gear elements can be housed to protect them against external influences. For this purpose a discontinuity can be provided in one or both disks, for example, as may be necessary in order to pass components, or the like, through them; there is no risk that the statics will be adversely affected by limited openings in one or both disks.

Since the two disks are arranged parallel to each other and the axis of rotation of the bearing passes through them perpendicularly, they do not cause any imbalance and their distribution of mass does not change as the bearing rotates, which is important particularly in the case of a hub rotating about another axis of rotation, to prevent an imbalance with respect to this "higher-ranking" axis of rotation.

It is within the scope of the invention that the distance between the two disks is approximately equal to, or slightly greater than, the height of the inner ring. Dimensioning of this kind makes it possible to preserve a gap between the two assemblies that are rotatable relative to each other—the respective ring and disk—which promotes smooth relative rotation between the two assemblies.

The invention can be developed further by mounting the planet gears in cantilever fashion, i.e., without a planet carrier. In this way, a planet gear can extend over the entire axial design height of the cavity between the two disks, thereby reducing the local pressure load of the tooth flanks to the technically feasible minimum, while at the same time keeping the design height of the bearing as small as possible.

For cantilever mounting of the planet gears, the latter are guided between the two disks. The end faces of the planet gears thus slide along the inner faces of the two disks. To minimize the resulting friction, the invention provides that the disks have a friction-reducing coating on their inner faces and/or that the planet gears have such a coating on their end faces.

Additional advantages are gained if the planet gears are configured as hollow and have an approximately cylinder jacket shape. The weight saved in this way is not inconsiderable, especially if the diameters of the inner toothing and the sun gear differ substantially from each other and the planet gears thus are very large. The friction between the planet gears and the disks is also reduced further in this way.

For the connection and/or mounting of the sun gear, at least one disk can have a central opening. There, the drive power can be conveyed into the gear unit from an externally installed motor.

In the context of a first embodiment of the invention, the sun gear is provided with a connection for the motor shaft of a drive motor concentric with the axis of rotation of the bearing. For this purpose, the sun gear can have an axial opening, for example in the form of a blind or throughpassing bore. If this opening is accessible from the outside through an opening aligned with it in a disk, at that location the drive shaft can be inserted into the sun gear and non-rotatably fixed, for example by means of a spring.

Finally, it is within the teaching of the invention that the sun gear has an (additional) toothing for meshing engagement with a drive pinion or a drive worm, particularly on the far side of the cavity between the two disks. In this way, on the one hand, further reduction can be gained, since the diameter of such an (additional) toothing can be much larger than the diameter of a pinion, or since a worm drive makes for extreme reduction; on the other hand, the sun gear can, in such cases, take the form of a completely open-center bushing, i.e., it can, as it were, have an opening that passes all the way through it between its two end faces. This makes it possible to guide cables, or the like, through the bearing, for example to run power cables from the gondola down into the tower.

BRIEF DESCRIPTION OF THE DRAWINGS

Further features, details, advantages and effects based on the invention will become apparent from the following description of a preferred embodiment of the invention and by reference to the drawings, wherein:

FIG. 4 shows a modified embodiment of the invention in a representation corresponding to FIG. 1, with a drive motor flanged on;

DESCRIPTION OF THE PREFERRED EMBODIMENTS

Figure 1:
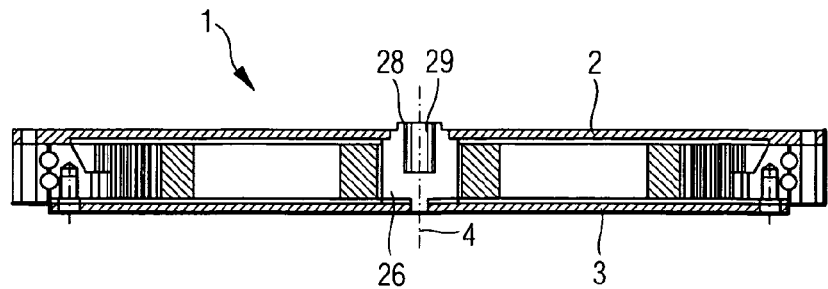
FIG. 1 is a section through an inventive blade bearing, or nacelle bearing, of a wind turbine along the axis of rotation of the bearing.

Bearings 1, 1' depicted in the drawings are adapted for use as blade or nacelle bearings of a wind turbine.

A blade bearing connects a rotor blade to a hub of a wind wheel of a wind turbine and makes it possible to adjust the pitch of the particular rotor blade to the current wind strength. Its axis of rotation is parallel to the longitudinal axis of the particular rotor blade and radial to the axis of rotation of the rotor hub. A blade bearing according to the invention can be connected to both of these components of a wind turbine, although this is not illustrated in the drawings.

By means of a nacelle bearing, a gondola or nacelle can be fastened rotatably about a vertical axis to a top end of a tower of the wind turbine. The orientation of the wind wheel can thus be constantly adjusted to the current wind direction. A nacelle bearing, according to the invention, can be connected to both of these components of a wind turbine, although this is not illustrated in the drawings.

A nacelle bearing usually does have a larger diameter and a greater load-bearing capacity than a blade bearing of the same wind turbine, since it has to sustain the sum of the wind forces exerted on a plurality of rotor blades and the weight of the wind wheel and the gondola.

Apart from the difference in scale, however, the two types of bearing nevertheless have a number of characteristics in common: Both types of bearing blade and nacelle are not rotated continuously, but are merely adjusted as a function of wind direction and wind strength. They are rotated little, or not at all, as long as the wind direction and wind speed are steady. Rotation is initiated slowly, usually by means of an electric motor. The forces that must be overcome in order to make an adjustment are almost exclusively inertial forces, and are therefore relatively minor in comparison to the statically occurring weight and/or wind forces.

Since the structures of these two types of bearing are therefore basically identical, they are not distinguished from each other in the drawing, i.e., the illustrated bearings 1, 1' can, with suitable design, be used as both the blade bearings and the nacelle bearing of a wind turbine.

As can be discerned from FIGS. 1 and 4, prominent elements of these bearings 1, 1' are, in both cases, two circular-ring- or circular-disk-shaped plates 2, 2' and 3, 3', which are disposed parallel to each other and concentrically with the rotation axis 4 of the particular bearing 1, 1' and which seal the respective bearing 1, 1' from above and below, respectively. The bearing per se is located in space between the two plates 2, 2'.

Figure 2:
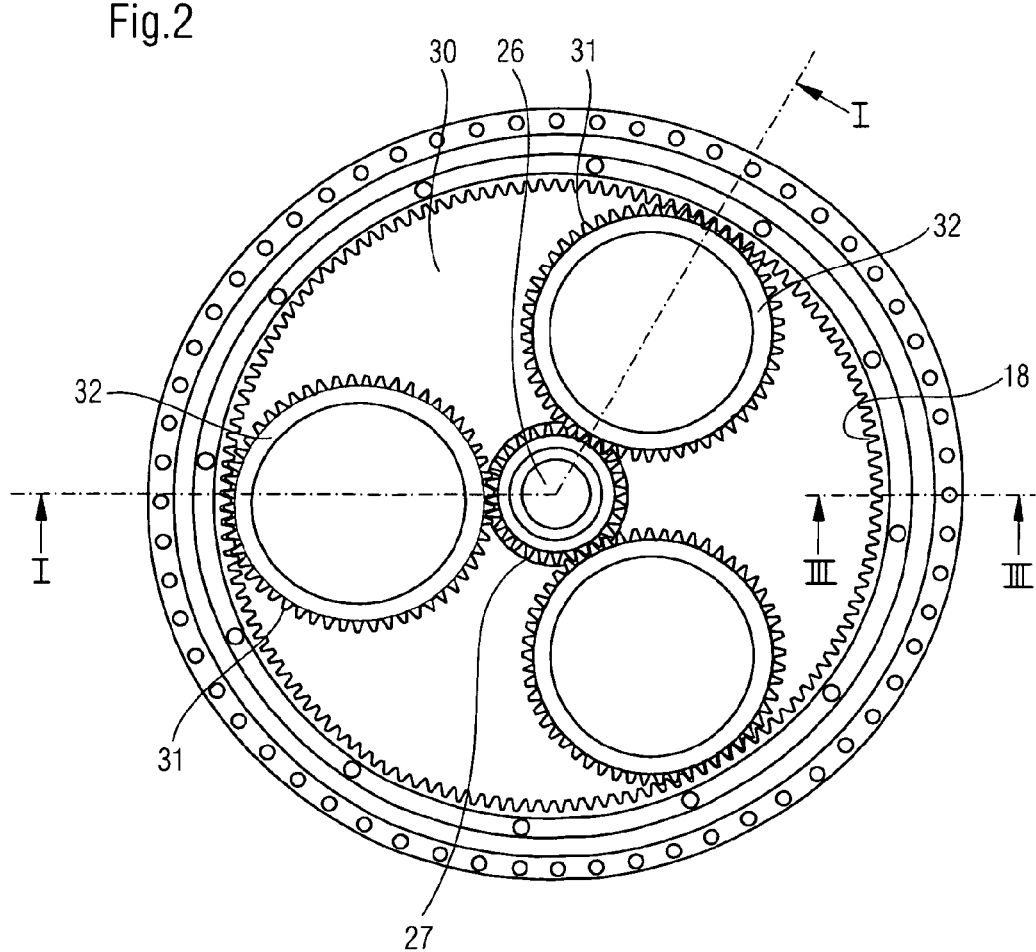
FIG. 2 is a section through the blade bearing or nacelle bearing of FIG. 1, transversely to its axis of rotation.
Figure 3:
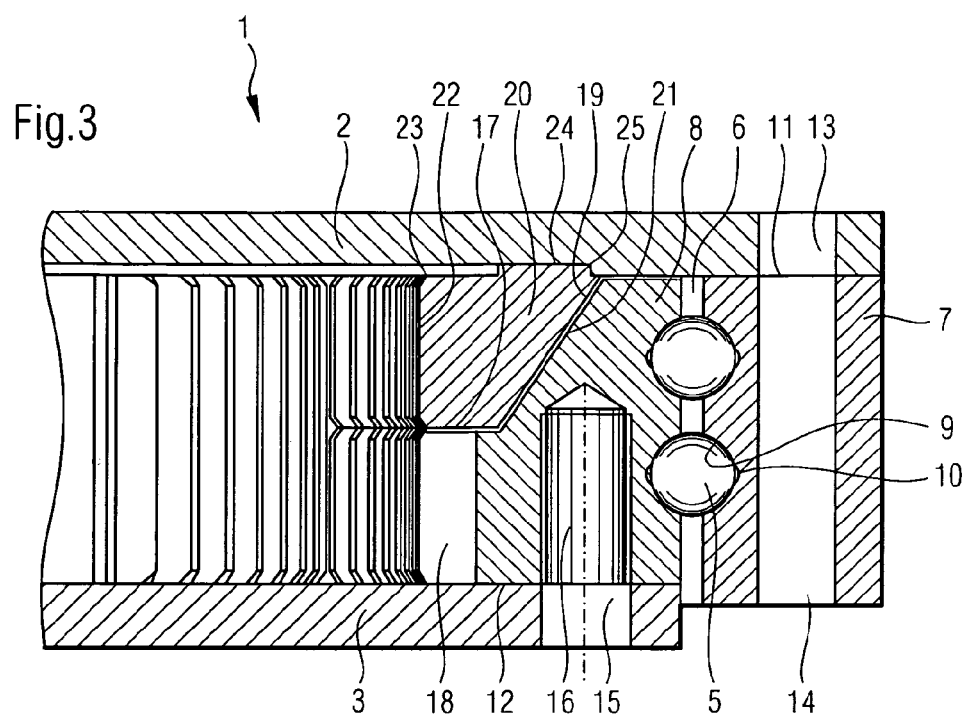
FIG. 3 is an enlarged detail from the sectional view of the bearing according to FIG. 1.

In the embodiment according to FIGS. 1 to 3, a double-row ball bearing is provided, having ball-shaped rolling elements 5 that roll in a gap 6 between two bearing rings, an outer bearing ring 7 and an inner bearing ring 8. Provided for this purpose on the side of each bearing ring 7, 8 facing the gap 6 are respective raceways 9, which in particular are incorporated directly into the base body of the respective ring. In the exemplary embodiment shown, the raceways 9 each have a concavely curved cross section, which is divided approximately medially into an upper and a lower region by a circumferential recess 10. Each of the two cross-sectional regions follows a circular line whose radius of curvature is slightly larger than the radius of the spherical rolling elements 5. There are consequently two contact points for each rolling-element ball 5 and bearing ring 7, 8, in a manner equivalent to a four-point bearing.

It should be noted that the use of a two-row bearing with spherical rolling elements 5 is not mandatory for the present invention; cylindrical, barrel-shaped, conical or needle-shaped rolling elements may also be used instead, or in addition. A single-row ball bearing is shown by way of example in FIG. 4; in roller bearings, usually three rows are provided, which run along the two sides and the end face of a flange provided on the one bearing ring 7, 8 and disposed in the gap 6, on one side, and a groove provided in the respective other bearing ring 8, 7 and spacedly surrounding the flange, on the other side.

As can readily be seen in FIG. 3, each of the two bearing rings 7, 8 is provided with a planar top and/or bottom side. Whereas the planar top side 11 of one bearing ring 7 butts flush against the also planar inner side of the upper plate 2, a planar bottom side 12 of the other bearing ring 8 rests against the planar inner side of the bottom plate 3. To connect the mutually abutting elements 2, 7; 3, 8 non-rotatably to one another, each of them is provided with bores 13, 14; 15, 16 that are distributed in a circle around the bearing rotation axis 4 and arranged parallel to said bearing rotation axis 4, and are of equal number and spacing, so as to be aligned with one another in pairs, so that screws, threaded bolts, or the like, can be passed through them to non-rotatably connect each bearing plate 2, 3 to a respective bearing ring 7, 8. Integral production of a respective bearing plate 2, 3 and bearing ring 7, 8 would also be conceivable; however, this would be very involved from a technological standpoint and would therefore be encountered rather infrequently in practice, although this variant is not excluded in principle.

As can further be discerned from FIG. 3, the inner bearing ring 8 extends in an axial direction between the two inner sides of the bearing plates 2, 3, but is connected to only one of the two. There is a small distance with respect to the other one, with the result that the bearing plate 2 located there, together with the outer ring 7 connected to it, is able to rotate smoothly relative to the assembly comprised of inner ring 8 and bearing plate 3.

According to FIG. 3, the inner side of the radially inner bearing ring 8 is structurally divided into two regions by a horizontal plane 17 passing substantially midway between the two plates 2, 3: Whereas the region that is the lower one in FIG. 3 is provided with a straight inner toothing 18 that is incorporated into the bearing ring 8, which is hollow-cylindrical at that location, the upper region, by contrast, recedes, or is set back radially outwardly. In the embodiment according to FIG. 3, the setback extends along a conical surface 19 that tapers from top to bottom radially toward the axis of rotation. The opening angle of this upside-down conical surface 19 is on the order of approximately 60°.

The upwardly reinforced, outward-receding conical surface 19 creates space for an additional, annular part 20, whose radial outer face 21 is shaped as a counterpart to the conical surface 19. The cylindrical inner surface of the ring 20 is provided with a straight inner toothing 22, which is incorporated into the hollow-cylindrical inner face of the ring 20. The radially inwardly disposed, straight end faces of the teeth 18, 22 are equal distances $r_H$ from the rotation axis 4.

The annular part 20 is provided with an essentially trapezoidal shape, on whose horizontally extending top side 23 a flat, circumferential flange 24 is formed. The latter engages form-lockingly in a circumferential channel 25, or groove, on the bottom side 12 of the upper bearing plate 2 and is thereby centered thereon. It is further connected non-rotatably to the bearing plate 2, discretionarily by clamping, gluing, welding, or the like.

All of the foregoing combines to yield a structure in which two inner toothings 18, 22 are provided, one above the other, inside the inner bearing ring 8, the lower toothing region 18 being connected to the inner ring 8 and to the bearing plate 3 that is the bottom plate in FIG. 3, whereas the upper toothing region 22 is connected non-rotatably to the outer ring 7 via the upper bearing plate 2. It should be noted at this point that the two toothings 18, 22 have tooth counts $z_1$, $z_2$ that differ slightly from each other, that is, $|z_1-z_2|>0$.

Disposed at the center of the bearing 1, concentrically with the rotation axis 4, is a sun gear 26 of radius $r_S$, which is mounted to one, or preferably both, bearing plates 2, 3 so as to be rotatable about the rotation axis 4 and is provided on its outer face with a circumferential end-face toothing 27. Provided at or in an outwardly accessible end face 28 of the sun gear 26 is a receiving space 29 for an output shaft of a drive motor, for example comprising a groove in which a spring can be disposed. The housing of such a drive motor can be fixed to, particularly flanged to, the particular bearing plate 2, optionally via an intermediate gear unit, particularly a reduction gear unit. The toothing 27 of the sun gear 26 extends substantially over the entire height, parallel to the axis, of the space between the two bearing plates 2, 3.

Due to the central sun gear 26, a cavity 30 that effectively remains between the bearing plates 2, 3 and the two inner toothings 18, 22 exhibits an annular shape with a radial extent $e=r_H-r_S$. Circulating in the annular cavity 30 is a plurality of planet gears 32, each provided with an end-face toothing 31 and having a diameter d that is slightly larger than the radial extent e of the annular cavity 30, that is, d−e>0, with the result that each planet gear 32 meshes both with the sun gear 26 and with the two inner toothings 18, 22.

The planet gears 32 are configured as hollow all the way through between their two end faces, with a comparatively thin wall thickness w that is preferably equal to, or less than, ¼ the diameter d of the planet gears 32: $w \leq ¼ \cdot d$; preferably equal to or less than ⅙ the diameter d of the planet gears 32: $w \leq d/6$; particularly equal to or less than ⅛ the diameter d of the planet gears 32: $w \leq d/8$. The planet gears 32 are very light as a result, and each has a large interior cavity for receiving a lubricant, for example grease.

Further, the planet gears 32 are mounted between the two bearing plates 2, 3 in cantilever fashion, i.e., without a planet carrier. For this purpose, the inner faces of the bearing plates 2, 3 and/or the end faces of the planet gears 32 can be provided with a friction-reducing coating, for example of Teflon, or the like.

The manner of operation of the arrangement is as follows: Since the housing of the drive motor is fixed to a bearing plate 2 but its output shaft is fixed to the sun gear 26, as the sun gear 26 is driven in rotation by the drive motor, a relative rotation v between the sun gear 26 and at least one inner toothing 22 is not equal to 0: $v \neq 0$; it is therefore impossible for the sun gear 26, the planet gears 32 and the rings 7, 8 carrying the inner toothings 18, 22 to revolve in unison. Instead, the planet gears 32 are offset in rotation about their respective axes and consequently roll off the two inner toothings 18, 22.

Since the tooth counts $z_1$, $z_2$, of the two inner toothings 18, 22 differ—if only slightly—from each other, the planet gears 32, in executing a complete relative revolution with respect to an inner toothing 18, traverse a relative angle $\alpha=360°$, accordingly $\alpha=z_1 \cdot 360°/z_1$; at the same time, the relative angle $\beta$ with respect to the other inner toothing 22 is, however, $\beta=z_1 \cdot 360°/z_2 \neq 360°$, because $z_1 \neq z_2$. It therefore follows that a relative rotation of the two inner toothings 18, 22 with respect to each other occurs that is equal to $\alpha-\alpha=z_1\cdot 360°/z_1-z_2\cdot 360°/z_2=360°\cdot(1-z_1/z_2)=360°\cdot(z_2/z_2-z_1/z_2)=360°\cdot(z_2-z_1)/z_2$. Hence, the smaller $\Delta z=z_2-z_1$ in relation to $z_1$ or $z_2$, the greater the reduction ratio of the gear unit consisting of the sun gear 26, the planet gears 32 and the inner toothings 18, 22, and the smaller the rated power of the drive motor can be chosen to be. There is, of course, a lower limit for $\Delta z=z_2-z_1$, dictated by the number p of planet gears 32 and their joint engagement with the sun gear 26, on the one hand, and with the regionally mutually offset inner toothings 18, 22, on the other hand, to wit: $\Delta z \geq p$, particularly $\Delta z = k\cdot p$, where $k=1, 2, 3 \ldots$. Provided that this condition is met, at the engagement point of the planet gears 32 the progressive tooth offset between the inner toothings 18, 22 will always have reached one or more teeth, and the teeth of both inner toothings 18, 22 that are located at that engagement point will be aligned.

Figure 4:
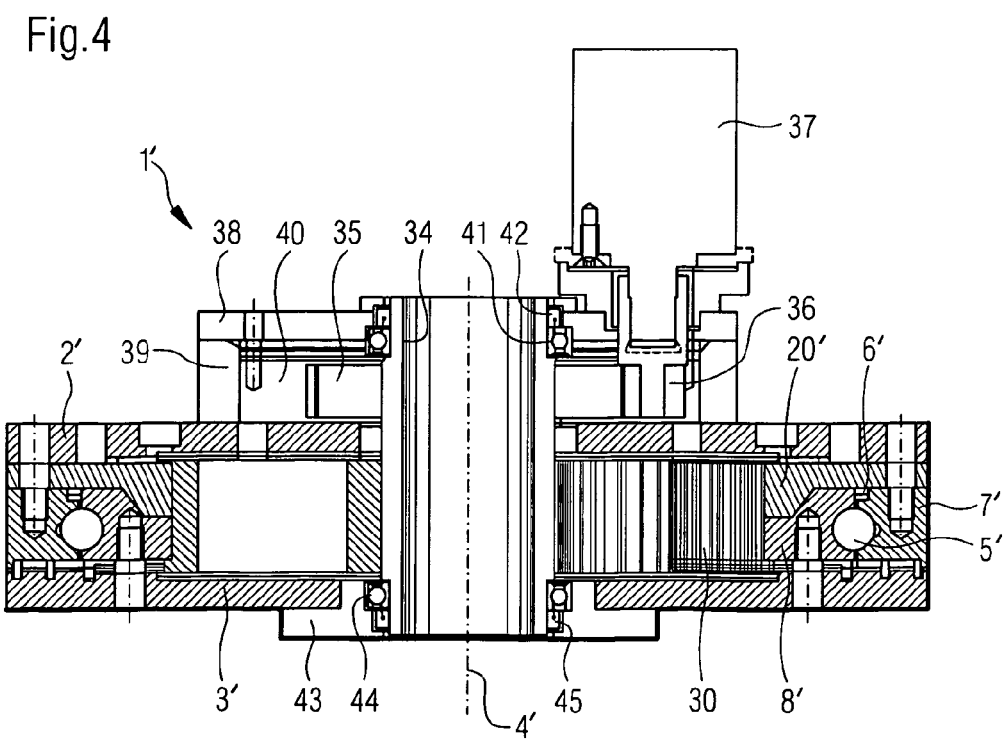

FIG. 4 shows another embodiment of a bearing 1' according to the invention, which, in contrast to bearing 1, is open-centered, i.e., allows cables, etc., to be passed through its center, and, for example, also provides an accessway for a person, in the case of a nacelle bearing. Although the basic structure is the same as in the case of bearing 1, there are a number of distinguishing features:

For one thing, in this case the ring 20' carrying the upper toothing 22 is not trapezoidal in cross section, but is substantially disk-shaped or annular-disk-shaped and is inserted between the upper plate 2' and the outer ring 7'. All three elements 2', 7', 20' have mutually aligned bores and are non-rotatably connected to one another by screws, bolts or the like, inserted in said bores. This is simpler and more effective than the clamping, gluing or welding of the ring 20 to the plate 2 mentioned in connection with bearing embodiment 1. The axial design height of the two bearing rings 7', 8' itself is naturally smaller in this case than the distance between the two bearing plates 2', 3'.

A further difference from the previously described embodiment is the fact that the bearing plate 3' connected to the inner ring 8' is widened radially to extend under or over the outer ring 7', as the case may be, so that it covers the gap 6' between the two bearing rings 7', 8'. One or more seals can be disposed in that region of the correspondingly broadened bearing plate 3' which overlaps with the outer ring 7'. For this purpose, in embodiment 1' according to FIG. 4, one or more circumferential grooves 33, each able to accommodate a sealing ring, are provided in the outer, overlapping region of the inner face of the particular bearing plate 3'.

The features of embodiment 1' that have been described so far can also, in principle, be used in bearing embodiment 1 according to FIGS. 1 to 3.

The open-centeredness of bearing 1', on the other hand, results from the fact that used there in place of a more or less solid sun gear 26 is a pipe 34 that passes all the way through the bearing 1' between its two bearing plates 2', 3', and is provided with an outer toothing at least at the level of the cavity 30 between the two bearing plates 2', 3'.

As FIG. 4 further shows, the pipe 34 is distinctly longer than the axial extent of the bearing 1', measured through its bearing plates 2', 3'. Particularly on the drive side, i.e., at the top in FIG. 4, the pipe 34 protrudes considerably past the plate 2' located there; above or outside of this plate 2', a gear 35 is fitted onto the pipe 34 and non-rotatably fixed thereto. Meshing therewith is a pinion 36 of a drive motor 37, which itself is arranged eccentrically with respect to the rotation axis 4' and thus does not hinder the passage of cables, etc., through the pipe 34.

The housing of the drive motor 37 is anchored, particularly screwed, to a bearing shield 38 for the near end—the top end, in FIG. 4—of the pipe 34. The bearing shield 38 preferably is not immediately adjacent the particular bearing plate 2', but is spaced apart from it by a ring 39. In a resulting cavity 40 between bearing plate 2', bearing shield 38 and spacing ring 39 there is space not only for the gear 35, but also for the pinion 36 of the drive motor 37 that meshes with it. Disposed between the hollow-cylindrically curved inner face of an opening in the center of the annular bearing shield 38 and the pipe 34 are a rolling bearing 41, on the one hand, and a seal 42, on the other.

A second bearing shield 43 is fixed to the opposite bearing plate 3', but here preferably without a spacing ring. Here again, both a rolling bearing 44 and a seal 45 are present between the hollow-cylindrically curved inner face of an opening at the center of the second, also annular bearing shield 43 and the pipe 34.

If the drive motor 37 from FIG. 4 is coupled indirectly, additional reduction is obtained by providing the gear 35 a different diameter from the pinion 36, making it possible to use a drive motor 37 with a further reduced rated power.

Although embodiment 1' in FIG. 4 is depicted as more compact than embodiment 1 from FIG. 1, both embodiments could basically also be fabricated with the dimensions of the respective other embodiment 1, 1'.

Figure 5:
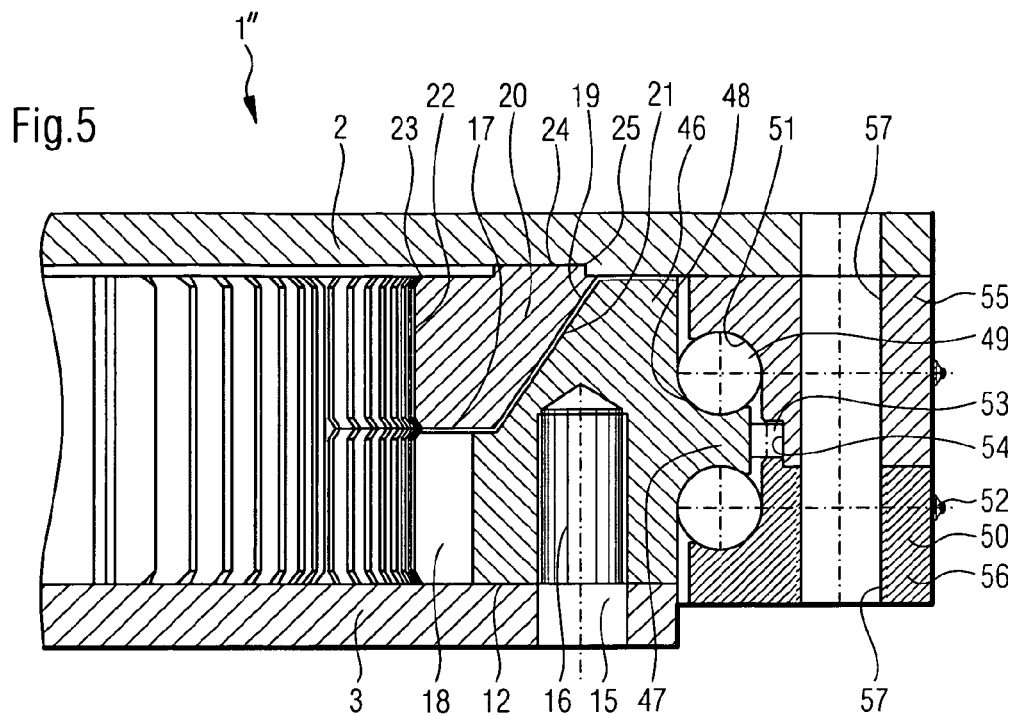
FIG. 5 shows an alternative embodiment of the invention in a representation corresponding to that of FIG. 3.
Figure 6:
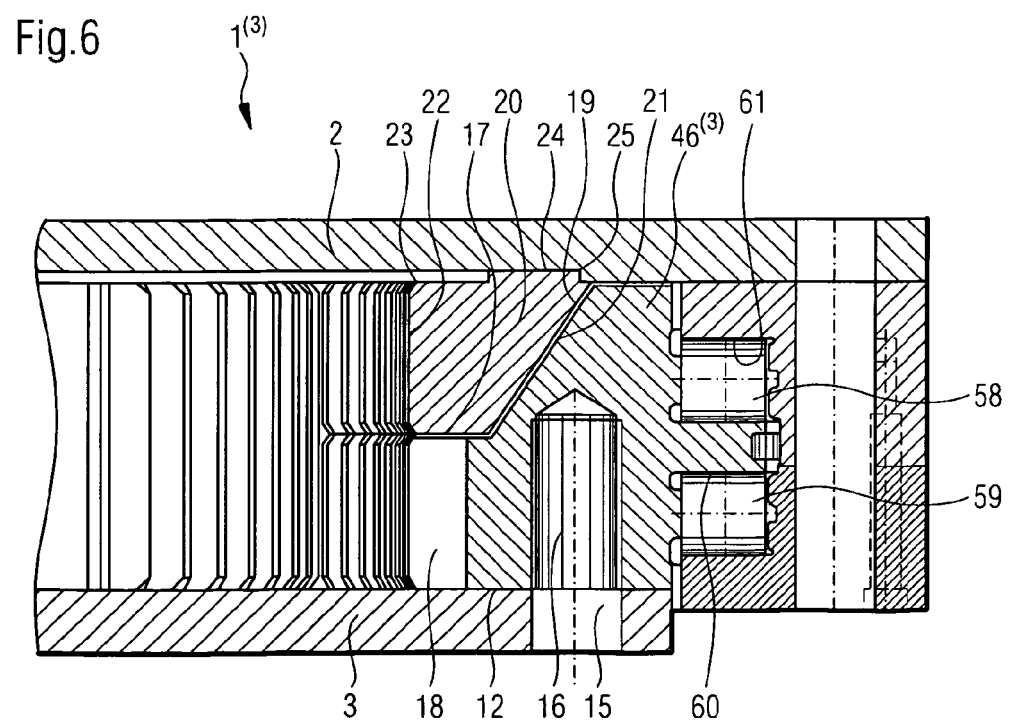
FIG. 6 shows a further modified embodiment of the invention in a representation corresponding to that of FIG. 3.

FIGS. 5 and 6 illustrate additional embodiments of the invention. These differ from the embodiment according to FIGS. 1 to 3 primarily in the design of the rolling bearing.

Whereas, in embodiment 1, according to FIGS. 1 to 3, a double-row, four-point bearing is provided, in which the rolling elements 5 roll between raceways 9 in approximately (hollow-) cylindrical boundary surfaces of the gap 6, in embodiment 1'', according to FIG. 5, provided at the circumference of a bearing ring facing the gap 6—this being a radially inner bearing ring 46 in the case illustrated here—is a circumferential flange 47 whose cross section transitions at its top and bottom sides, continuously and preferably also differentiably, to the adjacent (hollow) cylindrical contour of the particular bearing ring—here, the radially inner bearing ring 46—via a concave transverse curvature having a preferably roughly constant transverse radius of curvature. Each of the fillets created in this way serves as a raceway 48 for a respective row of spherical rolling elements 49, which serve wholly or primarily to transmit axial forces between two bearing rings 46, 50 and for this purpose also encounter, on the respective other bearing ring 50, a respective raceway 51 provided with a comparable transverse radius of curvature and thus, like the first raceway 48, optimally snugly embraces the rolling elements 49 rolling therealong. Each of these rolling element rows 49 can be assigned one or more lubricating nipples 52 through which the particular rolling element row 49 is supplied with grease.

The task of transmitting radial forces between the bearing rings 46, 50 is assumed by an additional row of rolling elements 53, which is disposed preferably midway, in the axial direction, between the other two rolling element rows 49. These elements can, where appropriate, be cylindrical rollers 53, which roll along the free end face of the circumferential flange 47, on one side, and, facing that, the oppositely disposed (hollow) cylindrical portion 54 of the other bearing ring 46, 50, their axes of rotation being oriented parallel to the axis of rotation of bearing embodiment 1'', i.e., in the axial direction.

The respective other bearing ring 50, 46 embraces the flange 47 of the first bearing ring 46, 50. So that assembly is nevertheless possible, the bearing ring 50, 46 without flange 47 is divided into two rings 55, 56, which lie behind or above each other in the axial direction and which during assembly can be fitted separately, from two sides, over the ring 46, 50 provided with the flange 47. In the final assembled state, the two rings 55, 56 are in planar contact with each other and have respective mutually aligned fastening bores 57 through which fastening screws, (stay) bolts or the like can be passed.

Embodiment $1^{(3)}$ differs from the last-described design 1" primarily in that in the context an axial bearing, rollers 58 are used instead of the spherical rolling elements 53; here, the rotation axes 59 of a respective row of rollers lie in a common plane and each strive radially away from the axis of rotation of the bearing. Associated raceways 60, 61 are thus configured as flat annular disks in this case.

The invention claimed is:

1. A blade bearing or nacelle bearing of a wind turbine, the bearing comprising two rings mounted adjacent to each other, and rotatable relative to each other, either for connection between a hub and a blade of the wind turbine, or for connection between a tower and a gondola of the wind turbine, wherein the two rings are rotatable relative to each other, and are each provided with, or non-rotatably coupled to, a circumferential inner toothing, for joint tooth engagement by one or more toothed planet gears revolving around a toothed central sun gear and meshing with the toothed sun gear, wherein each of the two rings is provided with or coupled to a respective disk, wherein the two disks are each fixed to mutually facing, planar end faces of a respective ring, wherein on a far side of a cavity between the two disks, the sun gear is provided with a toothing for meshing engagement with a drive pinion or a drive worm.

2. The blade bearing or nacelle bearing in accordance with claim 1, wherein the two disks are arranged parallel to each other with a distance therebetween generally equal to, or slightly greater than, a height of the inner ring.

3. The blade bearing or nacelle bearing in accordance with claim 1, wherein the disks are each provided with a friction-reducing coating on their inner face.

4. The blade bearing or nacelle bearing in accordance with claim 1, wherein the planet gears are mounted between the two disks without a planet carrier.

5. The blade bearing or nacelle bearing in accordance with claim 1, wherein the planet gears are hollow and exhibit a generally cylinder jacket shape.

6. The blade bearing or nacelle bearing in accordance with claim 1, wherein at least one disk is provided with a central opening for the connection and/or mounting of the sun gear.

7. The blade bearing or nacelle bearing in accordance with claim 1, wherein the sun gear is provided with a shape of a hollow bushing.

8. The blade bearing or nacelle bearing in accordance with claim 1, wherein the sun gear is provided with a connection for a motor shaft of a drive motor concentric with a rotation axis of the bearing.

9. The blade bearing or nacelle bearing in accordance with claim 1, wherein the circumferential inner toothings are provided with different tooth counts.

* * * * *